United States Patent Office 3,086,599
Patented Apr. 23, 1963

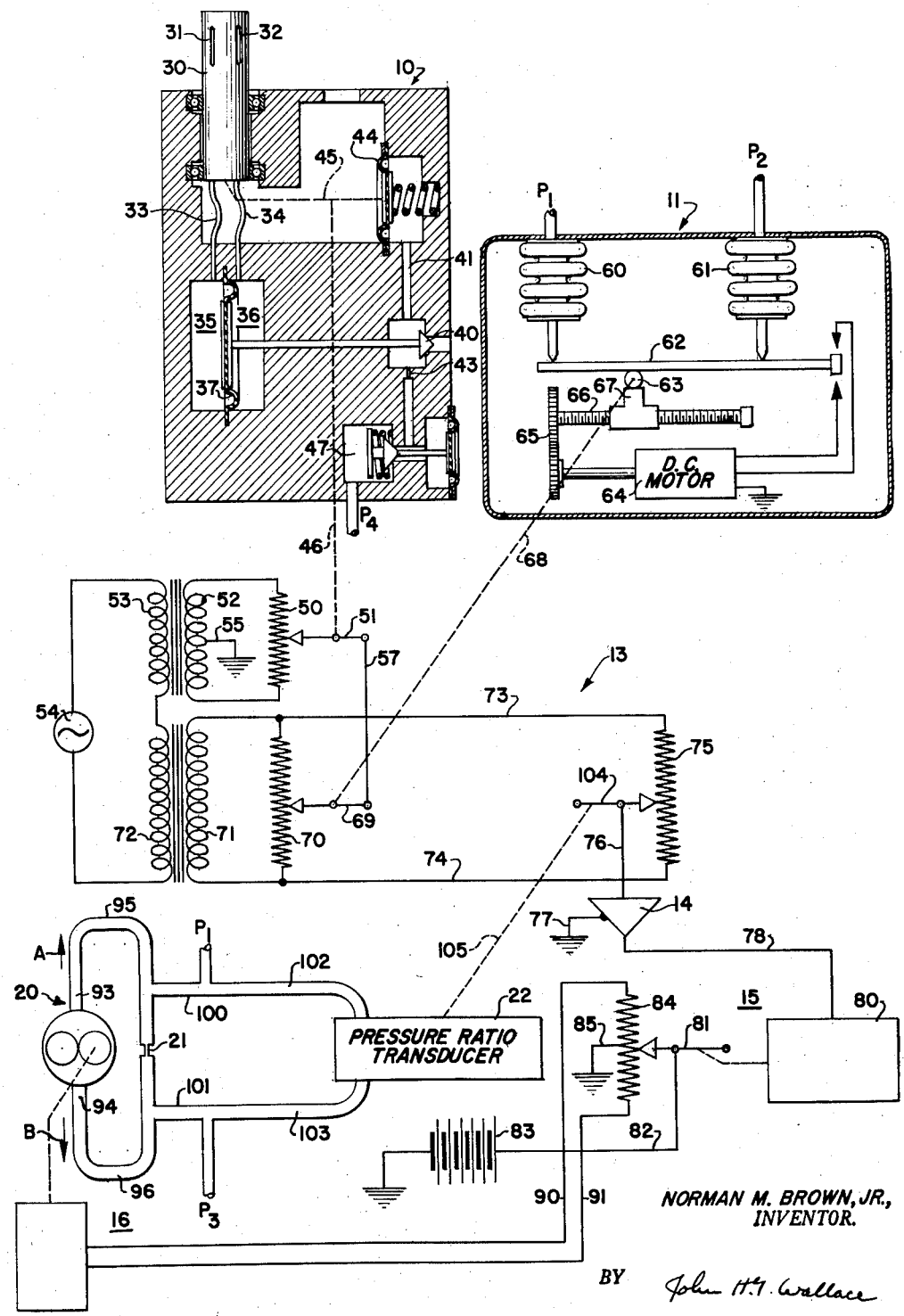

3,086,599
PITOT STATIC PRESSURE COMPENSATOR
Norman M. Brown, Jr., Tarzana, Calif., assignor to The Garrett Corporation, Los Angeles, Calif., a corporation of California
Filed Apr. 29, 1957, Ser. No. 655,783
5 Claims. (Cl. 73—178)

This invention pertains to a pressure compensating system and more particularly to a system which is designed to correct an indicated static pressure to give a true static pressure.

A true static pressure is required in modern aircraft, regardless of the attitude of the aircraft or the ambient conditions, for operating a large number of aircraft instruments and systems. The usual way of sensing static pressure is by means of a static pressure tap or Pitot tube which is subject to several sources of error such as turbulence, shock wave and the angle of attack of the static tap with respect to the airstream. Turbulence and shock wave errors are direct functions of the Mach number, which permits corrections to be determined as a function of the Mach number. The angle of attack depends upon various factors, such as, the weight of the aircraft, the vertical acceleration of the aircraft, the wing area and various functions of the Mach number. It has been determined that the true angle of attack can be determined by measuring an apparent angle of attack and correcting it by adding various functions of the Mach number.

The indicated angle of attack can be determined by use of an instrument having a sensing probe which intercepts the airstream and gives an indicated angle of attack. Such an instrument is disclosed in a co-pending application of Sydney E. Westman, entitled "Air Stream Direction Indicator," Serial No. 418,397, filed March 24, 1954, now Patent No. 2,834,208. The various functions of the Mach number can be determined by using a pressure ratio transducer which gives an output proportional to the ratio of the indicated static pressure to the impact pressure. Such an instrument is disclosed in the co-pending application of Sydney E. Westman, entitled "Pressure Ratio Measuring Instrument," Serial No. 403,135, filed January 11, 1954, now Patent No. 2,923,153.

Accordingly, it is the principal object of this invention to provide an instrument for correcting an indicated static pressure to give true static pressure, utilizing the apparent angle of attack and at least one function of the Mach number.

Another object of this invention is to correct the indicated static pressure by controlling the pressure ratio across an orifice in response to the indicated angle of attack and at least one function of the Mach number.

Another object of this invention is to provide a reversible air pump for controlling the pressure ratio across an orifice to either add to or subtract from the indicated static pressure to give true static pressure.

These and other objects and advantages of this invention will be more clearly understood by those skilled in the art to which it pertains, from the following detailed description when taken in conjunction with the attached drawing showing the schematic arrangement of a preferred embodiment.

This invention consists of an airstream direction measuring instrument 10 whose output controls a potentiometer 50. The output of the airstream direction measuring instrument is representative of the apparent or indicated airstream direction. The pressure ratio measuring instrument 11 measures the ratio between the indicated static pressure and the impact pressure and gives an output which varies as a function of the Mach number. The function of the Mach number, of course, should be adjusted so that it compensates for all of the various functions of the Mach number required for correcting the indicated static pressure ($P_1$) for shock wave, angle of attack and turbulence. The output of the pressure ratio measuring instrument 11 controls a second potentiometer 70. The output of the potentiometer 50 controlled by the airstream direction measuring instrument, is combined with the output of the potentiometer 70 and forms one leg of a normally balanced bridge circuit 13. The output or unbalance of the bridge circuit 13 is supplied to an amplifier 14 which controls a motor control circuit 15. The motor control circuit 15 will vary the speed and/or direction of the air pump drive motor 16 which is connected to a suitable air pump 20. The air pump 20 will control the pressure ratio across the orifice 21 so that it either adds to or subtracts from the indicated static pressure $P_1$. A second pressure ratio measuring instrument 22 senses the pressure ratio across the orifice 21 which is also the ratio of the true static pressure to indicated static pressure, and hence a measure of the correction applied. Thus, the output of the second pressure ratio measuring instrument 22 can be used to feed a signal back to the bridge circuit 13 to return it to a null or balanced position, thus maintaining the air pump motor 16 at a constant speed.

The airstream direction measuring instrument 10 has a rotatable probe 30 which is provided with two angularly spaced slots 31 and 32 which are directed so as to intercept the airstream. The slots 31 and 32 sense two pressures which are exactly equal when the plane including the two slots is normal to the relative wind. The two pressures sensed by the slots 31 and 32 are applied to two chambers 35 and 36 of a pneumatic amplifier by means of flexible conduits 33 and 34, respectively. The two chambers 35 and 36 are formed in the probe housing by means of a flexible diaphragm 37, the outer edges of which are retained by any desired means (not shown). The diaphragm is connected to the bleed valve 40 which modulates the pressure in the conduit 41. The conduit 41 is supplied with a regulated source of fluid pressure from a regulating valve 47 which, in turn, is connected to a source of fluid pressure $P_4$. The regulated pressure is supplied to the conduit 41 through a fixed orifice 43 so that only a metered amount is supplied to the conduit. The modulated pressure in conduit 41 is supplied to a pneumatic actuator 44 which is connected to the probe 30 by means of a suitable linkage 45. Thus, the pneumatic actuator 44 will return the probe to a position where two pressures sensed by the slots 31 and 32 are exactly balanced.

The pneumatic actuator 44 is also connected to the wiper arm 51 of the potentiometer 50 by means of a suitable linkage 46. The output of the potentiometer 50 will thus vary as the indicated angle of attack sensed by the probe 30 of the airstream direction measuring instrument 10. The potentiometer 50 is energized from the secondary winding 52 of a power transformer 53 which, in turn, is energized from any suitable source of alternating current 54. The center tap of the secondary winding 52 is connected to ground by means of a lead 55, thus the potentiometer 50 will be in a balanced or null position when the wiper arm 51 is at the center point of the resistance.

The pressure ratio transducer 11 is similar to that disclosed in the aforesaid Westman application, Serial No. 403,135, now Patent No. 2,923,153, and is provided with two bellows 60 and 61 which are connected to opposite ends of a normally balanced beam 62. The bellows 60 is supplied with the indicated static pressure $P_1$ by a suitable conduit and the bellows 61 is supplied with the measured impact pressure $P_2$ by another conduit. The beam 62 is balanced about a movable fulcrum 63 which is moved along the beam so as to balance the indicated static pressure against the measured impact pressure. The balancing of the beam is accomplished by means of two switches which are positioned on opposite sides of the right end of the beam and sense any unbalance of the beam. The switches energize a suitable motor 64 which drives a gear train 65 connected to a lead screw 66 which moves a fulcrum carrier 67 along the beam. The fulcrum carrier 67 is connected to the wiper arm 69 of the potentiometer 70 by means of a suitable linkage 68. The pressure ratio measuring instrument 11 will measure the ratio between the pressures $P_1$ and $P_2$ which ratio is equal to a function of the Mach number. By providing suitable cams in the linkage 68 the output of the potentiometer 70 can be made to equal any desired function or combination of functions of the Mach number. The potentiometer 70 is energized from the secondary winding 71 of a second power transformer 72 which is also energized from the source of alternating current 54. The output of the potentiometer 50 which varies with the indicated angle of attack is connected to the output of the potentiometer 70, which varies as a combination of functions of the Mach number, by means of a lead 57. The two potentiometers 50 and 70 form one leg of the normally balanced bridge circuit 13.

The ends of the potentiometer 70 are connected by means of leads 73 and 74 to another potentiometer 75 which forms the other leg of the bridge circuit 13. The output of the potentiometer 75 is connected to an amplifier 14 by means of a lead 76. The amplifier 14 is also connected to ground by means of a lead 77 so that the signal can be detected between the output of the potentiometer 75 and ground. The output of the amplifier 14 is used to control a motor 80 which forms a part of the motor control circuit 15 and positions the wiper arm 81 of a potentiometer 84. The center of the potentiometer 84 is connected to ground by means of a lead 85 while the ends of the potentiometer 84 are connected to an air pump drive motor 16 by means of suitable leads 90 and 91. The air pump drive motor 16 is connected to the air pump 20 which has a suitable inlet 93 and outlet 94. The air pump 20 should preferably be of a type which will pump fluid in either direction, such as a gear pump, and also should be formed of a material which does not require any lubrication, such as plastic or the like. The inlet and outlet of the gear pump 20 are connected to opposite sides of the orifice 21 by means of conduits 95 and 96. The indicated static pressure $P_1$ is also connected to the conduit 95 by means of a conduit 100 and to one bellows of the pressure ratio transducer 23 by means of a conduit 102. The conduit 96 is connected to a conduit which supplies true static pressure $P_3$ to any desired location by means of a conduit 101 which is also connected to the second bellows of the pressure ratio transducer 22 by means of a conduit 103. The output of the pressure ratio transducer 22 which senses the pressure ratio across the orifice 21 is used to position the wiper arm 104 of the potentiometer 75 by means of linkage 105.

It can thus be easily seen that the air pump 20 can either add or substract from the indicated static pressure $P_1$. This results from the fact that when the air flow direction from the pump 20 is in the direction A an increase in the speed of rotation of the pump 20 will increase the indicated static pressure $P_1$ and will lower the true static pressure $P_3$. The opposite effect will happen when the flow from the pump is in the direction B. While the air pump 20 will increase the temperature of the air this will not introduce an error into the true static pressure since the actual pressure ratio across the orifice 21 is controlled by the second pressure ratio transducer 22 and not the pressure added or subtracted from the indicated static pressure $P_1$. If the air temperature increases, the air pump will run at a slower speed while the opposite effect will take place when the air temperature is decreased.

Before the above described compensating system is operated, the airplane to which it is applied must be flight tested and the required corrections determined in the various functions of the Mach number and the indicated angle of attack. After these corrections have been determined cams may be provided for the airstream measuring instrument 10 and the pressure ratio measuring instrument 11 to feed the required corrections to the bridge circuit 13. The use of cams in these instruments is more fully explained in the above-referenced co-pending application of Sydney E. Westman, Serial No. 403,135, now Patent No. 2,923,153. After the airplane has been calibrated, the bridge circuit 13 will control the motor circuit 15 in response to changes in the indicated angle of attack of the airplane and turbulence and shock wave phenomena which affect the static pressure probe. The motor control circuit 15 in turn will control the speed and direction of the air pump motor 16 so as to either add to or substract from the indicated pressure $P_1$. The second pressure ratio transducer 22 will sense the pressure across the orifice 21 which is a ratio of the true static pressure to the indicated pressure and, hence, the correction applied. Thus, the pressure ratio transducer 22 can feed a signal back to the bridge circuit 13 and return it to a balanced or null position. When the bridge circuit is returned to a null position, the air pump motor 16 will run at a constant speed in one direction. The air will then be circulated in an essentially closed loop to provide the required pressure $P_3$ which will be equal to the true static pressure.

While but one preferred embodiment of this invention has been described in detail, it is subject to many possible modifications and changes without departing from its scope.

I claim:

1. A static pressure compensating system for aircraft, comprising: means for sensing an apparent angle of attack of said aircraft and generating a first electrical output representative of said apparent angle of attack; pressure ratio measuring means for sensing the ratio between an apparent static pressure and impact pressure, and generating a second electrical output representing a function of the flight Mach number of said aircraft; a bridge circuit; means for combining the sum of said first and second outputs in one leg of said bridge circuit; an air pump controlled in response to the unbalance of said bridge circuit to provide a variable pressure output; means for combining the output of said air pump with a source of apparent static pressure to give true static pressure; and follow up means responsive to relative variations between said apparent static pressure and said true static pressure for changing the other leg of said bridge circuit to establish bridge balance.

2. A static pressure compensating system for aircraft, comprising: means for sensing the apparent angle of attack of said aircraft and generating a first electrical output representative of said apparent angle of attack; pressure ratio measuring means for sensing the ratio between an apparent static pressure and impact pressure, and generating a second electrical output representing a function of the flight Mach number of said aircraft; a bridge circuit; means for combining the sum of said first and second outputs in one leg of said bridge circuit, the unbalance of said bridge representing an error signal; an air pump controlled as to speed and direction of rotation in response to said error signal to provide a variable pressure output; means for combining the output of said air pump with a source of apparent static pressure to give true static pressure; and pressure measuring means for measuring the ratio of said true static pressure to said apparent static pressure and varying the other leg of said bridge in response to said ratio to return said bridge circuit to a null position of balance.

3. A static pressure compensating system for aircraft, comprising: means for sensing an apparent angle of attack of said aircraft and generating a first output representative of said apparent angle of attack; pressure ratio measuring means for sensing the ratio between an apparent static pressure and impact pressure, and generating a second electrical output representing a function of the flight Mach number of said aircraft; a bridge circuit; means for combining the sum of said first and second outputs in said bridge circuit, the unbalance of said bridge circuit representing an error signal; motor driven air pumping means; means for controlling said motor in response to said error signal including an error signal amplifier, whereby the pump output is representative of said error; means for combining the output of said air pumping means with a source of apparent static pressure to give a source of true static pressure; and means responsive to relative variations between said apparent static pressure and said true static pressure for adjusting said bridge circuit to a balanced condition.

4. A static pressure compensating system for aircraft, comprising: means for sensing an apparent angle of attack of said aircraft and generating a first electrical output representative of said apparent angle of attack; pressure ratio measuring means for sensing the ratio between an apparent static pressure and impact pressure, and generating a second electrical output representing a function of the flight Mach number of said aircraft; a bridge circuit; means for adding said first and second outputs in said bridge circuit; pressure supply means operable to provide a controlled variable source of pressure; and mechanism responsive to unbalance of the bridge circuit to adjust the pressure provided at the controlled pressure source in a direction determined by the condition of bridge unbalance comprising: means for sensing relative variation between said apparent static pressure and the pressure provided by the controlled variable source, and means operable in response to the last mentioned means to restore bridge balance when the pressure provided at the controlled variable source reaches a true static pressure value.

5. A static pressure compensating system for aircraft, comprising: means for sensing an apparent angle of attack of said aircraft and generating a first electrical output representative of said apparent angle of attack; pressure ratio measuring means for sensing the ratio between an apparent static pressure and impact pressure, and generating a second electrical output representing a function of the flight Mach number of said aircraft; a bridge circuit; means for adding said first and second outputs in said bridge circuit, the unbalance of the bridge circuit representing an error signal; pressure supply means operable to provide a controlled variable source of pressure; and mechanism responsive to unbalance of the bridge circuit to adjust the pressure provided at the controlled pressure source in a direction determined by the error signal comprising: means for sensing the ratio between said apparent static pressure and the pressure provided at the controlled variable source, and follow up means operable in response to the last mentioned means to balance out the bridge error signal when the pressure provided at the variable source reaches a true static pressure value.

References Cited in the file of this patent
UNITED STATES PATENTS

| | | |
|---|---|---|
| 2,542,717 | Smith | Feb. 20, 1951 |
| 2,551,470 | Smith | May 1, 1951 |
| 2,725,746 | Young | Dec. 6, 1955 |
| 2,751,786 | Coulbourn | June 26, 1956 |
| 2,814,198 | Howland | Nov. 26, 1957 |
| 2,944,736 | Elms | July 12, 1960 |
| 3,002,382 | Gardner | Oct. 3, 1961 |